US011355810B2

(12) United States Patent
Haertel et al.

(10) Patent No.: US 11,355,810 B2
(45) Date of Patent: Jun. 7, 2022

(54) CELL HOLDER STRUCTURE FOR HOLDING RECHARGEABLE BATTERY CELLS

(71) Applicant: Andreas Stihl AG & Co. KG, Waiblingen (DE)

(72) Inventors: Alexander Haertel, Ludwigsburg (DE); Joachim Kolb, Ludwigsburg (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 146 days.

(21) Appl. No.: 16/722,864

(22) Filed: Dec. 20, 2019

(65) Prior Publication Data

US 2020/0220122 A1  Jul. 9, 2020

(30) Foreign Application Priority Data

Jan. 7, 2019  (EP) ..................................... 19150490

(51) Int. Cl.
*H01M 50/213* (2021.01)
*H01M 50/291* (2021.01)
(Continued)

(52) U.S. Cl.
CPC ....... *H01M 50/213* (2021.01); *H01M 50/291* (2021.01); *H01M 50/503* (2021.01); *H01M 50/507* (2021.01); *H01M 2220/30* (2013.01)

(58) Field of Classification Search
None
See application file for complete search history.

(56) References Cited

U.S. PATENT DOCUMENTS 6,439,738 B1 * 8/2002 Matthews ............. H01M 6/425
362/194
6,439,783 B1   8/2002 Antoshenkov
(Continued)

FOREIGN PATENT DOCUMENTS

DE   10 2011 101 022 A1   11/2012
EP        2 284 928 A2     2/2011
(Continued)

OTHER PUBLICATIONS

German-language European Search Report issued in counterpart European Application No. 19150490.1 dated Jul. 29, 2019 with partial English translation (nine (9) pages).
(Continued)

*Primary Examiner* — Gregg Cantelmo
(74) *Attorney, Agent, or Firm* — Crowell & Moring LLP (57) ABSTRACT

A cell holder structure for holding a plurality of battery cells includes a holder base part and a holder cover part forming an array of cell-receiving spaces and cell intermediate spaces lying inbetween. The holder base part has one or more base side cell supporting pillars extending axially from a base plane of the holder base part into cell intermediate spaces and has a circumferential side securing wall region abutting in an axially and radially position securing manner against a circumferential surface of battery cells to be accommodated in the cell receiving spaces, and/or the holder cover part has one or more cover side cell-supporting pillars which extend axially from a cover plane of the holder cover part into the cell intermediate spaces and have a circumferential side securing wall region abutting in an axially and radially position securing manner against a circumferential surface of the rechargeable battery cells.

16 Claims, 6 Drawing Sheets

(51) Int. Cl.
*H01M 50/503* (2021.01)
*H01M 50/507* (2021.01)

(56) References Cited

U.S. PATENT DOCUMENTS

| | | | |
|---|---|---|---|
| 9,703,002 B1 | 7/2017 | Olsson et al. | |
| 2008/0314792 A1* | 12/2008 | Daeschler | H01M 50/213 |
| | | | 206/705 |
| 2010/0047676 A1 | 2/2010 | Park et al. | |
| 2010/0221590 A1* | 9/2010 | Reber | B25F 5/02 |
| | | | 429/99 |
| 2011/0039142 A1 | 2/2011 | Kwag et al. | |
| 2012/0021260 A1* | 1/2012 | Yasui | H01M 10/6554 |
| | | | 429/53 |
| 2015/0118529 A1* | 4/2015 | Ahn | H01M 10/6562 |
| | | | 429/72 |
| 2015/0287964 A1 | 10/2015 | Park et al. | |
| 2019/0221814 A1* | 7/2019 | Shimizu | H01M 50/502 |
| 2020/0203686 A1* | 6/2020 | Park | H01M 50/242 |

FOREIGN PATENT DOCUMENTS

| | | | | |
|---|---|---|---|---|
| JP | 02024959 A | * | 1/1990 | H01M 50/213 |
| WO | WO 2008/018714 A1 | | 2/2008 | |
| WO | WO 2017/220514 A1 | | 12/2017 | |

OTHER PUBLICATIONS

U.S. Appl. No. 16/571,994, filed Sep. 16, 2019.

* cited by examiner

CELL HOLDER STRUCTURE FOR HOLDING RECHARGEABLE BATTERY CELLS

CROSS REFERENCE TO RELATED APPLICATION

This application claims priority under 35 U.S.C. § 119 from European Patent Application No. 19150490.1, filed Jan. 7, 2019, the entire disclosure of which is herein expressly incorporated by reference.

BACKGROUND AND SUMMARY OF THE INVENTION

The invention relates to a cell holder structure for holding a plurality of rechargeable battery cells, wherein the cell holder structure comprises a holder base part and a holder cover part which is connectable to the latter, said holder base part and holder cover part together forming an array of cell receiving spaces and cell intermediate spaces lying inbetween. The invention furthermore relates to a rechargeable battery pack comprising such a cell holder structure and comprising rechargeable battery cells held by the latter.

Various embodiments of cell holder structures of this type are known. They serve to hold the rechargeable battery cells which are typically suitably connected electrically in series and/or in parallel in order to supply an electrical device with electrical energy. For this purpose a multiplicity of structurally identical rechargeable battery cells, in particular of circular cylindrical design or another elongated design, are generally arranged and held in the cell receiving spaces of the cell holder structure, and the cell holder structure with the inserted rechargeable battery cells is conventionally used in a rechargeable battery pack, for example arranged in a housing of the rechargeable battery pack. The cell receiving spaces are arranged in an array, i.e. in a two dimensional arrangement which is typically a regular arrangement, e.g. a rectangular grid or triangular grid arrangement. When required, a plurality of such two dimensional arrays of cell receiving spaces and cell intermediate space lying inbetween can be provided lying one above other, i.e. offset with a direction component perpendicular to a plane of the array, within the same cell holder structure or by using one or more further cell holder structures.

The rechargeable battery cell pack equipped with such a cell holder structure and the rechargeable battery cells held in the latter can serve in particular for the electrical energy supply of a hand held electrical device, such as a portable or ground guided garden and/or forest processing device. For example, the rechargeable battery pack can be such as is disclosed in the applicant's earlier EP application No. 18194901.7, the contents of which are hereby incorporated into the description by reference.

A battery pack with a cell holder structure of the type mentioned at the beginning is disclosed in laid open application DE 10 2011 101 022 A1. The cell holder structure there is configured specially for holding circular cylindrical battery cells and, with its cell receiving spaces, is configured for receiving all battery cells, i.e. rechargeable battery cells, having an identical pole direction, that is to say that, for example, the positive pole of all of the rechargeable battery cells faces the holder base part or the holder cover part. For the play free holding of the rechargeable battery cells in the cell receiving spaces, spring tongues which provide an axial spring force are proposed on the holder base part and spring webs which provide a radial spring force are proposed on the holder cover part. For the electrical connection of the rechargeable battery cells in parallel and series group by group, use is made of plate like cell connectors which can be mounted on the holder base part or on the holder cover part and are provided with contact tongues which are bent at a right angle and run along a wall side of a housing which is formed by the holder base part and four wall sides.

It is an object of the invention to provide a cell holder structure of the type mentioned at the beginning which, with relatively little outlay, permits improved holding of the rechargeable battery cells in comparison to the prior art mentioned above. Furthermore, the invention is based on providing a rechargeable battery pack equipped with such a cell holder structure.

The invention achieves this and other objects by providing a cell holder structure and a rechargeable battery pack according to the claimed invention. The cell holder structure is configured to hold a plurality of rechargeable battery cells for a rechargeable battery pack and comprises a holder base part and a holder cover part which is connectable to the latter, said holder base part and holder cover part together forming an array of cell-receiving spaces and cell intermediate spaces lying inbetween.

According to one aspect of the invention, the holder base part, which may also be referred to as holder rear side part or holder front side part or holder lower side part or holder upper side part, has one or more base side cell supporting pillars which extend axially from a base plane of the holder base part into assigned cell intermediate spaces and have a circumferential side securing wall region which is configured for abutting in an axially and radially position securing manner against a circumferential surface of rechargeable battery cells to be accommodated in the cell receiving spaces. Axially means a longitudinal direction of the cell receiving spaces and therefore also of the rechargeable battery cells when the latter are inserted into the cell receiving spaces, i.e. a direction which is non parallel and is preferably perpendicular to the base plane of the holder base part. Radially means a lateral direction or plane perpendicular to the axial direction. The cell receiving spaces are adapted in their shape to those of the rechargeable battery cells, for example cylindrically or cuboidally. Base side means that the relevant cell-supporting pillar is part of the holder base part. The rechargeable battery cells with their circumferential surface, typically their cylindrical lateral surface, can therefore be placed or supported in an axially and radially positionally secured manner against the circumferential side securing wall region of a base side cell supporting pillar or preferably of a plurality of adjacent base side cell-supporting pillars. This contributes in a structurally simple manner to reliable, play free holding of the rechargeable battery cells in the cell receiving spaces on the holder base part. A plurality of such base side cell supporting pillars is preferably provided. In addition, the base side cell supporting pillars can thereby prevent the rechargeable battery cells, if the latter are inserted first into the holder base part, from being undesirably able to pass or drop axially out of same before the holder cover part and the holder base part are completely mounted on each other. The positional securing of the respective rechargeable battery cell in the axial direction and in a radial, i.e. lateral, direction perpendicular thereto on the holder base part can be realized, depending on requirements, by force fitting and/or form fitting contact of the one or more adjacent, base side cell supporting pillars. The securing wall region is formed, for example, by a region of a pillar lateral surface of the cell-supporting pillars.

According to a further aspect of the invention, which can be provided additionally or alternatively to the abovementioned inventive aspect, the holder cover part, which is a component which is connectable to the holder base part opposite the latter, and which may correspondingly also be referred to as holder front side part or holder rear side part or holder upper side part or holder lower side part, has one or more cover side cell supporting pillars which extend axially from a cover plane of the holder cover part into the cell intermediate spaces and have a circumferential side securing wall region which is configured for abutting in an axially and radially position securing manner against a circumferential surface of rechargeable battery cells to be accommodated in the cell receiving spaces. Cover side merely means here that the relevant cell supporting pillar is part of the holder cover part. The rechargeable battery cells with their circumferential surface, typically their cylindrical lateral surface, can thus be placed or supported in an axially and radially positionally secured manner against the circumferential side securing well region of a cover side cell-supporting pillar or preferably of a plurality of adjacent cover side cell supporting pillars. This contributes in a structurally simple manner to a reliable, play free holding of the rechargeable battery cells in the cell receiving spaces on the holder cover part. A plurality of such cover side cell supporting pillars is preferably provided. In addition, the cover side cell supporting pillars can thereby prevent the rechargeable battery cells, if they are inserted first into the holder cover part, from being able to undesirably pass or drop out axially from same before the holder cover part and the holder base part are completely mounted on each other. The positional securing of the respective rechargeable battery cell in the axial direction and in a radial, i.e. lateral, direction perpendicular thereto on the holder cover part can be realized, depending on requirements, by force fitting and/or form fitting contact of the one or more adjacent cover side cell supporting pillars.

According to a further aspect of the invention, which can be provided additionally or alternatively to one or more of the abovementioned inventive aspects, the cell receiving spaces have a greater clear receiving width in a central region of the array than in a peripheral region of the array. It goes without saying that this property, like other properties mentioned here of the cell holder structure, relates, unless stated otherwise or unless readily understood by a person skilled in the art, to a preassembly state in which the rechargeable battery cells have not yet been fitted into the cell receiving spaces or any rate the holder cover part and the holder base part are not yet connected to each other and the rechargeable battery cells are held supported in the cell receiving spaces. This measure can advantageously contribute to holding rechargeable battery cells in the cell receiving spaces in the central region of the array with an approximately identical supporting force or contact pressure force, i.e. approximately identical supporting pressure or contact pressure force, as in the peripheral region of the array when, during the mounting of the holder cover part on the holder base part, slight lateral deformations of the cell supporting pillars occur in the cell receiving spaces because of the rechargeable battery cells coming to bear against said cell supporting pillars. Such slight lateral deformations of the cell supporting pillars could otherwise lead to higher force loadings arising for rechargeable battery cells in the central region of the array, because of the supporting/contact pressure of the cell supporting pillars, than for rechargeable battery cells in the peripheral region of the array. This effect is counteracted by a somewhat larger clear receiving width by the cell receiving spaces being made available to the rechargeable battery cells in a central region of the array than for the rechargeable battery cells in the peripheral region of the array.

In a development of the invention, at least one of the base side cell supporting pillars widens conically in the direction of the base plane of the holder base part, at least in an axial partial region which contains the securing wall region of said pillar. This measure can facilitate a centred insertion of the rechargeable battery cells into the part of the cell receiving spaces that is provided by the holder base part before the holder cover part is mounted on the holder base part, and/or can facilitate the position securing lying of the base side cell supporting pillar against the circumferential surface of the rechargeable battery cell. A plurality of and, more preferably, all of the base side cell supporting pillars are preferably thereby configured conically in the relevant axial partial region.

In a development of the invention, at least one of the cover side cell supporting pillars is widened conically in the direction of the cover plane of the holder cover part, at least in an axial partial region containing the securing wall region of said pillar. This measure can facilitate a centred insertion of the rechargeable battery cells into the part of the cell receiving spaces that is provided by the holder cover part before the holder cover part is mounted on the holder base part, and/or can assist the position securing lying of the cover side cell supporting pillar against the circumferential surface of the rechargeable battery cell. A plurality of and, more preferably, all of the cover side cell supporting pillars are preferably thereby configured conically in the relevant axial partial region.

In a development of the invention, at least one of the base side cell supporting pillars and/or of the cover side cell supporting pillars is of dome shaped or frustoconical design at least in a pillar end region containing the securing wall regions. This measure may be of advantage in terms of manufacturing and functionally. Preferably, a plurality of the base side cell supporting pillars and/or a plurality of the cover side cell supporting pillars and, more preferably, all of the base side cell supporting pillars and/or all of the cover side cell-supporting pillars are thereby of dome shaped or frustoconical design at their relevant pillar end region. The conicity of the frustoconical shape or dome shape can facilitate the fitting of the rechargeable battery cells into the cell receiving spaces and can promote supporting of the rechargeable battery cells with their circumferential surface in a reliably axially and radially position securing manner on the associated circumferential side securing wall region of the respective base side and/or cover side cell supporting pillar.

In a development of the invention, at least one of the base side cell supporting pillars has a hollow pillar structure, and its securing wall region is exposed towards the base plane of the holding base part. This realization of the pillar advantageously permits a radially elastic yielding of the securing wall region unobstructed by the base plane of the holder base part, as a result of which, when a rechargeable battery cell is inserted into an adjacent cell receiving space, the securing wall region can be pressed away in a radially elastic manner by the rechargeable battery cell and is then positioned with a restoring pressure against the circumferential surface of the rechargeable battery cell. This promotes the provision of a comparatively high position securing force against the rechargeable battery cell moving away axially and radially from the holder base part.

In a development of the invention, at least one of the cover side cell supporting pillars has a hollow pillar structure, and its securing wall region is exposed towards the cover plane of the holder cover part. This realization of the pillar advantageously permits a radially elastic yielding of the securing wall region unobstructed by the cover plane of the holder cover part, as a result of which, when a rechargeable battery cell is inserted into an adjacent cell receiving space, the securing wall region can be pressed away in a radially elastic manner by the rechargeable battery cell and is then positioned with a restoring pressure against the circumferential surface of the rechargeable battery cell. This promotes the provision of a comparatively high position securing force against the rechargeable battery cell moving away axially and radially from the holder cover part.

In a development of the invention at least one of the base side cell supporting pillars has, in its securing wall region, a bearing projection protruding radially towards one of the cell receiving spaces, and/or at least one of the cover side cell supporting pillars has, in its securing wall region, a bearing projection protruding radially towards one of the cell receiving spaces. Preferably, a plurality of and, more preferably, all of the base side cell supporting pillars and/or of the cover side cell supporting pillars are provided with one or more of the bearing projections protruding radially from the securing wall region. The bearing projection can very advantageously assist or reinforce the axially and radially position securing lying of the relevant securing will region against the inserted rechargeable battery cell. For example, in corresponding realizations, it can be wedged or latched or clamped or interlocked to a bearing edge on the circumference of the rechargeable battery cell and can thereby hold the rechargeable battery cell in a manner very readily secured against moving out axially.

In a development of the invention, in order to provide the larger clear receiving width of the cell receiving spaces in the central region of the array in relation to the smaller clear receiving width of the cell receiving spaces in the peripheral region of the array, at least one of the base side cell supporting pillars and/or of the cover side cell supporting pillars has a greater radial dimension in the peripheral region of the array than at least one of the base side cell supporting pillars and/or of the cover side cell supporting pillars in the central region of the array.

This measure can be realized structurally in a relatively simple manner, for example by a correspondingly different configuration of the outside diameter of the relevant cell supporting pillars. Preferably, a plurality of the base side cell supporting pillars and/or a plurality of the cover side cell supporting pillars and, more preferably, all of the base side cell supporting pillars and/or all of the cover side cell supporting pillars are thereby formed in the central region of the array with a smaller outside diameter than the base side and/or cover side cell supporting pillars in the peripheral region of the array. The variation in diameter can be selected, depending on requirements, depending on the distance of the cell supporting pillar from a centre point of the array or from a peripheral edge of the array in one or a few steps or virtually continuously.

In a refinement of the invention, said measure is realized in that the bearing projection of at least one of the base side cell supporting pillars and/or of the cover side cell supporting pillars has a greater radial dimension in the peripheral region of the array than the bearing projection of at least one of the base side cell supporting pillars and/or the cover side cell supporting pillars in the central region of the array. Preferably, a plurality of the base side cell supporting pillars and/or a plurality of the cover side cell supporting pillars and, more preferably, all of the base side cell supporting pillars and/or all of the cover side cell supporting pillars are thereby formed in the central region of the array with the bearing projection of smaller radial extent than the base side and/or cover side cell supporting pillars in the peripheral region of the array. The variation in the radial dimension of the bearing projection can be selected, according to requirements, depending on the distance of the cell supporting pillar from a centre point of the array or from a peripheral edge of the array in one or a few steps or virtually continuously.

Preferably, a plurality of, and, more preferably, all of the base side cell-supporting pillars and/or of the cover side cell supporting pillars are provided in the peripheral region of the array with one or more of the bearing projections protruding radially from a pillar lateral surface. In addition, preferably a plurality of and, more preferably, all of the base side cell supporting pillars and/or of the cover side cell-supporting pillars in the central region of the array are provided with one or more of the bearing projections which protrude radially from the pillar lateral surface and the radial dimension of which is smaller than that of the bearing projection or bearing projections of the one or more cell supporting pillars in the peripheral region of the array. Alternatively, the respective base side and/or cover side cell-supporting pillar in the central region of the array does not have any such bearing projection. The bearing projections can be realized, for example, as punctiform projections or humps or lugs or as linear webs running on the circumferential side and/or axially.

In a development of the invention, at least one of the base side cell-supporting pillars has a greater length than the cover side cell supporting pillars. Preferably, a plurality of, and, more preferably, all of the base side cell supporting pillars have a greater pillar length than the cover side cell supporting pillars. The greater length of the base side cell supporting pillars in comparison to the cover side cell supporting pillars can promote the mounting process by being able to act over a correspondingly large axial length as side boundaries when the rechargeable battery cells are placed into the holder base part, more precisely into the part of the cell receiving spaces that is provided by the holder base part, before the holder cover part is then mounted on the holder base part. Their greater length makes it possible for the base side cell supporting pillars to securely hold the loosely inserted rechargeable battery cells securely in the respective cell receiving space in said preassembly state as long as the holder base part is not tilted excessively.

According to a further aspect of the invention, which can be provided additionally or alternatively to each of the abovementioned inventive aspects, the cell receiving spaces are configured for receiving the rechargeable battery cells in an identical position axially irrespective of the pole direction, and at least one plate like cell connector is provided which can be mounted on the holder base part or on the holder cover part and in each case has at least one positive pole contact zone and at least one negative pole contact zone, wherein the positive pole contact zone and the negative pole contact zones protrude at a differing contact zone height from a plate plane of the cell connector.

This measure permits a highly advantageous realization of a rechargeable battery cell arrangement, which is connected electrically in parallel and in series in a desired manner, by using said cell holder structure. For this purpose, the rechargeable battery cells can already be introduced in groups with opposed pole directions into the cell receiving spaces, which are suitably configured for this purpose, in such a manner that they are accommodated there in a substantially identical axial position, i.e. all of the rechargeable battery cells at their axial end edges have substantially the same axial position irrespective of whether they point, for example, with their plus pole in the direction of the holder base part or in the direction of the holder cover part. By the differing contact zone height of its positive or negative pole contact zone, the plate like cell connector takes account of the fact that, in the typical rechargeable battery cells used in this case, the plus pole ends at a different axial distance from the facing axial end edge of the rechargeable battery cell than the minus pole.

The plus pole of the rechargeable battery cell often protrudes axially further over the axial end edge of the rechargeable battery cell than the minus pole, and therefore, in the case of two rechargeable battery cells which are accommodated in their cell receiving spaces in an identical position axially, but with an opposed direction of polarity, the plus pole of the one rechargeable battery cell protrudes axially on the relevant side over the minus pole of the other rechargeable battery cell. The plate like cell connector can compensate for this by its differing contact zone heights of the positive pole contact zone, which serves for the electrical contact connection to a rechargeable battery cell plus pole, and the negative pole contact zone, which serves for the electrical contact connection to a rechargeable battery cell minus pole.

In a development of the invention, a plurality of structurally identical cell connectors is provided, said cell connectors being able to be mounted either on the holder base part or on the holder cover part. This means that structurally identical cell connectors can be used for mounting on the holder base part and on the holder cover part, which renders the manufacturing of cell connectors which can be mounted specifically only on the holder base part or only on the holder cover part superfluous.

In a development of the invention, the respective cell connector can be mounted on the holder base part or on the holder cover part by means of a clamping and/or snap connection. This constitutes an advantageously simple and functionally reliable connection of the cell connector on the holder base part or on the holder cover part.

In a development of the invention, corresponding positioning marks are provided on the cell connector, on the one hand, and on the holder base part and/or on the holder cover part, on the other hand, for positionally correctly mounting the cell connector on the holder base part or on the holder cover part. This simplifies the attaching of the cell connector to the holder base part or to the holder cover part by the corresponding positioning marks preventing an erroneous positioning of the cell connector during the mounting.

The rechargeable battery pack according to the invention comprises a cell holder structure according to the invention and a plurality of rechargeable battery cells held by the cell holder structure. The rechargeable battery cells are held securely and in a play free manner in said cell holder structure, as explained above. The rechargeable battery pack is thereby in particular also suitable for applications in which the rechargeable battery pack may be subjected to shaking or impact effects. In particular, the rechargeable battery pack is suitable for the electrical energy supply of hand held electrical devices, such as electrically driven garden and forest processing devices which are portable or are carried on the back or are guided on the ground.

Other objects, advantages and novel features of the present invention will become apparent from the following detailed description of one or more preferred embodiments when considered in conjunction with the accompanying drawings.

DETAILED DESCRIPTION OF THE DRAWINGS

The cell holder structure shown with its various components in various views in FIGS. 1 to 18 serves for holding a plurality of rechargeable battery cells for a rechargeable battery pack and comprises a holder base part 1 and a holder cover part 2 which is connectable to the latter, said holder base part and holder cover part together forming an array 7, i.e. a preferably regular two-dimensional arrangement, of cell-receiving spaces 3 and cell intermediate spaces 4 lying inbetween.

In corresponding embodiments, the holder base part 1, as in the example shown, has one or more base-side cell-supporting pillars 5 which each extend axially from a base plane 1a of the holder base part 1 into one of the cell intermediate spaces 4 and have a circumferential-side securing wall region 5a which is configured for lying in an axially and radially position-securing manner against a circumferential surface of rechargeable battery cells to be accommodated in the cell-receiving spaces 3. In advantageous realizations, the holder base part includes a plurality of base-side cell-supporting pillars 5 in a regular two-dimensional arrangement, for example, as shown, in a matrix-like arrangement with lines and columns of cell-supporting pillars 5. In this case, each cell-receiving space 3 which is not at the edge has four adjacent cell intermediate spaces 4 and cell-supporting pillars 5 and therefore four associated securing wall regions 5a which are each formed by a partial circumferential surface of the circumference of the cell-supporting pillars 5, said partial circumferential surface extending over approx. 45° to 90°. In alternative embodiments, the array 7 has, for example, a hexagonal or a trigonal structure.

In corresponding embodiments, the holder cover part 2 has one or more cover-side cell-supporting pillars 6 which each extend axially from a cover plane 2a of the holder cover part 2 into one of the cell intermediate spaces 4 and have a circumferential-side securing wall region 6a which is configured for lying in an axially and radially position-securing manner against a circumferential surface of rechargeable battery cells to be accommodated in the cell-receiving spaces 3. In advantageous realizations, the holder cover part 2 includes a plurality of cover-side cell-supporting pillars 6 in a preferably regular two-dimensional arrangement, for example, as shown, in a matrix-like arrangement of lines and columns of cell-supporting pillars 6, wherein this arrangement generally corresponds to that of the base-side cell-supporting pillars 5, for which, consequently, there are the same abovementioned realization alternatives.

In an advantageous embodiment, the one or preferably more base-side cell-supporting pillars 5 on the holder base part 1 and the one or preferably more cover-side cell-supporting pillars 6 on the holder cover part 2 are present with the characteristic mentioned of their circumference-side securing wall region 5a, 6a. In alternative embodiments, cell-supporting pillars having said special configuration of a circumference-side securing wall region are provided only on the holder base part 1 or only on the holder cover part 2.

In corresponding embodiments of the cell holder structure, the cell-receiving spaces 3 have a greater, central, clear receiving width Wm in a central region 7a of the array 7 and a by contrast smaller, peripheral, clear receiving width Wp in a peripheral region 7b of the array 7, as in the example shown. In addition, in corresponding embodiments, the holder base part 1 has the base-side cell-supporting pillars 5 with the characteristic mentioned of their securing wall region 5a or, alternatively, conventional cell-supporting pillars or, furthermore alternatively, no cell-supporting pillars. Analogously, in corresponding embodiments, the holder cover part additionally has the cell-supporting pillars 6 with the characteristic mentioned of their securing wall region 6a or, alternatively, conventional cell-supporting pillars or, furthermore, alternatively, no cell-supporting pillars. The greater receiving width Wm in the central array region 7a can compensate for the effect that the cell-receiving spaces 3 in the central array region 7a can be constricted to a somewhat greater extent than in the peripheral array region 7b by the introduction of the rechargeable battery cells into the cell-receiving spaces 3 since the cell-receiving spaces in the central array region 7a are surrounded by more other cell-receiving spaces 3 than the cell-receiving spaces 3 in the peripheral array region 7b and slight lateral deformations of the cell-supporting pillars because of the insertion of the rechargeable battery cells can therefore mount up to a somewhat greater extent in the central array region 7a than in the peripheral array region 7b. The boundary between the central array region 7a and the peripheral array region 7b can be suitably defined in accordance with requirements, i.e. the peripheral array region 7b includes the edge-side cell-receiving spaces 3 and optionally further adjacent cell-receiving spaces 3 up to a predefinable maximum distance from the edge of the array 7, and the central array region 7a comprises the remaining inner cell-receiving spaces 3. However, the boundary may also be selected to be stepped or sliding.

The specific configuration of the securing wall region 5a makes it possible for the rechargeable battery cells, when they are fitted into the part of the cell-receiving spaces 3 that belongs to the holder base part 1 or to the holder cover part 2, to be secured axially and radially in their position by the base-side or cover-side cell-supporting pillar(s) 5, 6 such that the rechargeable battery cells can be held in a play-free manner radially and secured against undesirably moving out axially, even in a preassembly state in which the rechargeable battery cells are inserted into the holder base part 1 or the holder cover part 2, but the holder base part 1 and the holder cover part 2 are not yet connected to each other forming a corresponding rechargeable battery cell block.

In corresponding embodiments, at least one of the base-side cell-supporting pillars 5 is of dome-shaped or frusto-conical design at least in an axial partial region containing its securing wall region 5a, and/or widens conically in the direction of the base plane 1a of the holder base part 1, i.e. an outside diameter Ad of the cell-supporting pillars 5 increases in this direction. In the example shown, this is the case in all of the base-side cell-supporting pillars 5; in alternative embodiments, this is the case only for some of the base-side cell-supporting pillars 5, if any at all.

In corresponding embodiments, at least one of the cover-side cell-supporting pillars 6 is of dome-shaped or frusto-conical design at least in an axial partial region containing its securing wall region 6a, and/or widens conically in the direction of the cover plane 2a of the holder cover part 2. In the example shown, this is the case for all of the cover-side cell-supporting pillars 6; in alternative embodiments, this is the case only for some of the cover-side cell-supporting pillars 6, if any at all.

Said conical or dome-shaped or frustoconical configuration of the cell-supporting pillars 5, 6 facilitates a centred insertion of the rechargeable battery cells into their cell-receiving spaces and can also assist the position-securing placing of the cell-supporting pillars against the circumferential surface of the inserted rechargeable battery cells.

In corresponding embodiments, at least one of the base-side cell-supporting pillars 5 has a hollow pillar structure, and its securing wall region 5a is exposed towards the base plane 1a of the holder base part 1. In the exemplary embodiment shown, this is the case for all of the base-side cell-supporting pillars 5; in alternative embodiments, that is the case only for some of the base-side cell-supporting pillars 5, if any at all.

In corresponding embodiments, at least one of the cover-side cell-supporting pillars 6 has a hollow pillar structure, and its securing wall region 6a is exposed towards the cover plane 2a of the holder cover part 2. In the example shown, this is the case for all of the cover-side cell-supporting pillars 6; in alternative embodiments, this is the case only for some of the cover-side cell-supporting pillars 6, if any at all.

The hollow pillar structure and the exposing of the securing wall region 5a, 6a with respect to the base plane 1a of the holder base part 1 or with respect to the cover plane 2a of the holder cover part 2 requires the securing wall region to yield radially elastically, and therefore the securing wall region can be pressed elastically radially somewhat out of the cell-receiving space 3 by an inserted rechargeable battery cell, in order then to be placed by an elastically restoring pressure against the circumference of the rechargeable battery cell. This can be realized with little outlay on manufacturing and is of advantage for providing a high positional securing force against the rechargeable battery cell moving axially and radially away from the holder base part 1 or from the holder cover part 2.

The exposing of the securing wall region 5a, 6a with respect to the base plane 1a or cover plane 2a can be realized, for example, by the base plane 1a or the cover plane 2a being recessed in the region of the securing wall region 5a, 6a, and/or by the securing wall region 5a, 6a being recessed adjacent to the base plane 1a or cover plane 2a. For this purpose, in the exemplary embodiment shown, a part of the securing wall regions 5a, 6a towards the base plane 1a or towards the cover plane 2a has a recess 17a, 17b, and, for a remaining part of the securing wall regions 5a, 6a, the base plane 1a or the cover plane 2a is provided with a base recess 18a or cover recess 18b in the corresponding region adjacent to the securing wall region 5a, 6a.

In corresponding embodiments, at least one of the base-side cell-supporting pillars 5 has, in its securing wall region 5a, a bearing projection 8a protruding radially towards the cell-receiving spaces 3. In the example shown, this is the case for all the base-side cell-supporting pillars 5; in alternative realizations, this is the case only for some of the base-side supporting pillars 5, if any at all.

In corresponding embodiments, at least one of the cover-side cell-supporting pillars 6 has, in its securing wall region 6a, a bearing projection 8b protruding radially towards the cell-receiving spaces 3. In the example shown, this is the case for all of the cover-side cell-supporting pillars 6; in alternative realizations, this is the case only for some of the cover-side cell-supporting pillars 6, if any at all.

In advantageous realizations, the bearing projection 8a, 8b, as in the example shown, is located in the section of the securing wall region 5a, 6a directly adjacent to the base plane 1a or the cover plane 2a where the securing wall region 5a, 6a is exposed towards the base plane 1a or cover plane 2a, wherein the bearing projection 8a, 8b towards the base plane 1a or cover plane 2a ends axially substantially flush with the adjacent pillar lateral surface of the securing wall region 5a, 6a. In advantageous embodiments, the respective bearing projection 8a, 8b is formed on its radial outer side in a conically widened manner in the axial direction towards the base plane 1a or cover plane 2a, as in the example shown. This can assist the insertion of the rechargeable battery cells or the sliding of the bearing projection 8a, 8b onto the circumference of the rechargeable battery cell during the insertion of the rechargeable battery cell into the cell-receiving space 3 and also the form-fitting or force-fitting, for example interlocking or clamping, interaction of the bearing projection 8a, 8b, in particular of a lower edge of the bearing projection 8a, 8b that faces the recess 17a, 17b, 18a, 18b, with the circumference of the rechargeable battery cell or the lateral surface of the rechargeable battery cell.

In corresponding embodiments, at least one of the base-side cell-supporting pillars 5 and/or the cover-side cell-supporting pillars 6 has a greater radial dimension in the peripheral array region 7b, for example in the form of the outside diameter Ad, than at least one of the base-side cell-supporting pillars 5 and/or of the cover-side cell-supporting pillars 6 in the central array region 7a. This can apply to all of the base-side and cover-side cell-supporting pillars 5, 6 in the peripheral array region 7b or central array region 7a; in alternative embodiments, this can apply only for a part of said cell-supporting pillars. The greater clear receiving width Wm, which is desired when required, of the cell-receiving spaces 3 in comparison to the receiving width Wp of the cell-receiving spaces 3 in the peripheral array region 7b can therefore be provided for the central array region 7a in a structurally advantageous manner.

Alternatively or additionally, in advantageous realizations as in the exemplary embodiment shown, at least the bearing projection of at least one of the base-side cell-supporting pillars 5 and/or of the cover-side cell-supporting pillars 6 has a greater radial dimension in the peripheral array region 7b than the bearing projection of at least one of the base-side cell-supporting pillars 5 and/or of the cover-side cell-supporting pillars 6 in the central array region 7a. The desired greater radial dimension, when required, for the base-side and/or cover-side cell-supporting pillars 5, 6 in the peripheral array region 7b in comparison to those in the central array region 7a can therefore be obtained in a structurally simple manner.

In corresponding embodiments, at least one of the base-side cell-supporting pillars 5 has a greater pillar length Sl than the cover-side cell-supporting pillars 6. In the exemplary embodiment shown, this is the case for all of the base-side cell-supporting pillars 5; in alternative embodiments, this is the case only for some of the base-side cell-supporting pillars 5, if any at all. The selection of a larger pillar length Sl for the base-side cell-supporting pillars 5 can facilitate the preassembly of the rechargeable battery cells which, in this case, are preferably premounted on the holder base part, i.e. fitted into its portion of the cell-receiving spaces 3. Both the fitting of the rechargeable battery cells and the play-free securing thereof until the holder base part 1 and holder cover part 2 are finally mounted can be assisted by the longer base-side cell-supporting pillars 5.

In a corresponding embodiment of the cell holder structure, the cell-receiving spaces 3, as in the exemplary embodiment shown, are configured for receiving the rechargeable battery cells in an identical position axially irrespective of the pole direction. The cell holder structure comprises at least one plate-like cell connector 9 which can be mounted on the holder base part 1 or on the holder cover part 2 and in each case has at least one positive pole contact zone 10 and at least one negative pole contact zone 11, said pole contact zones protruding at a differing contact zone height Hp, Hn from a plate plane 9a of the cell connector 9, as is apparent, for example, from FIG. 16. In the example shown, each of said cell connectors extends over six cell-receiving spaces 3 arranged in a 2×3 partial array. In a manner corresponding thereto, the array 7 is divided into 2×3 partial arrays by partitions 1b, 2b on the holder base part 1 and/or on the holder cover part 2.

Such a characteristic of the cell holder structure makes it possible already to introduce the rechargeable battery cells in groups with opposed pole directions into the cell-receiving spaces 3 in a substantially identical position axially, wherein different pole contact zone heights are compensated for by the cell connector. In the example shown, the rechargeable battery cells of one row are each inserted with an identical pole direction and with a reversed pole direction in comparison to those of a directly adjacent row.

Figure 15:
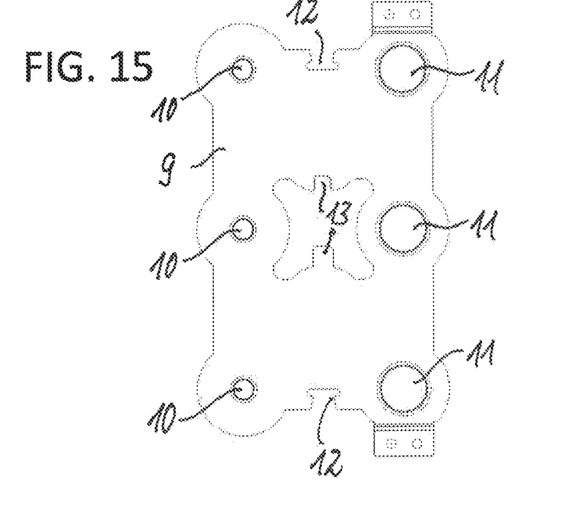
FIG. 15 shows a top view of a plate-like cell connector with three positive and negative pole contact zones.
Figure 16:
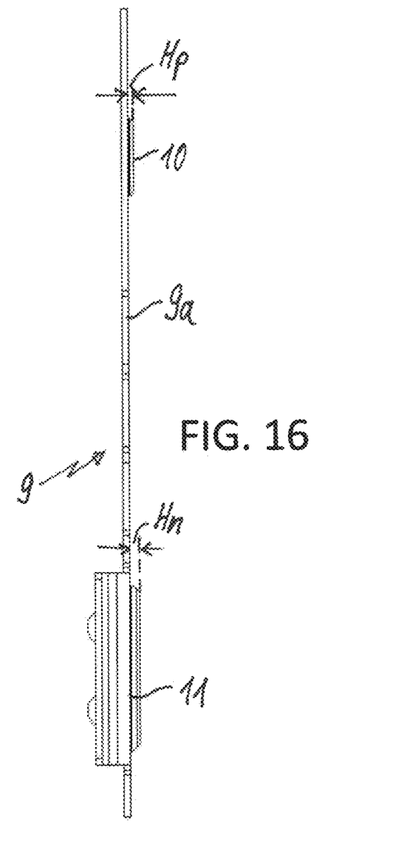
FIG. 16 shows a side view of the cell connector from FIG. 15.
Figure 17:
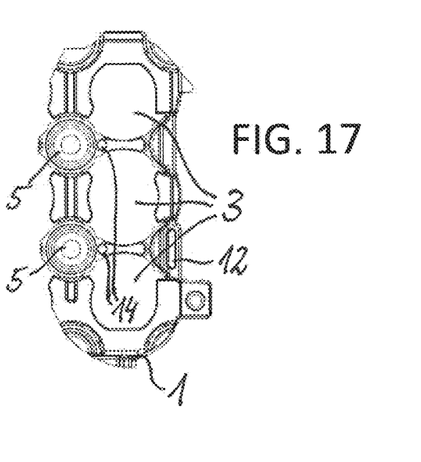
FIG. 17 shows a top view, in partial section, of the holder base part in a peripheral region.
Figure 18:
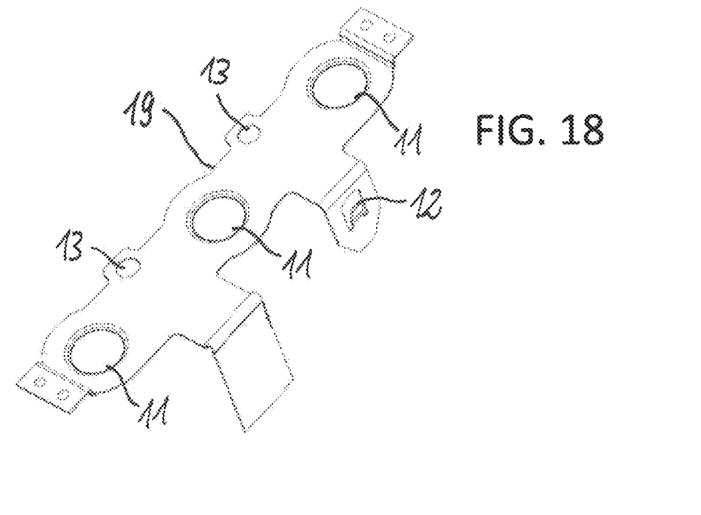
FIG. 18 shows a perspective view of a plate-like cell connector with three identical pole contact zones.

In advantageous embodiments, a plurality of structurally identical cell connectors 9 is provided, said cell connectors being able to be mounted either on the holder base part 1 or on the holder cover part 2. This possibility of using structurally identical cell connectors contributes to a low outlay on manufacturing and mounting. In the exemplary embodiment shown, only a single type of cell connector 9, as is shown for example in FIG. 15, is thus basically required for the cell holder structure, optionally supplemented by an edge-side cell connector 19, as is illustrated in FIG. 18.

In corresponding realizations, the respective cell connector 9, 19 can be mounted on the holder base part 1 or on the holder cover part 2 by means of a clamping and/or snap connection 12. This also assists a simple mounting of the cell holder structure.

In advantageous embodiments, corresponding positioning marks 13, 14 are provided on the cell connector 9, 19, on the one hand, and on the holder base part 1 and/or on the holder cover part 2, on the other hand, for positionally correctly mounting the cell connector 9, 19 on the holder base part 1 or on the holder cover part 2. This simplifies the attaching of the cell connector 9, 19 to the holder base part 1 or to the holder cover part 2, by the positioning marks 13, 14 eliminating an erroneous positioning.

Figure 1:
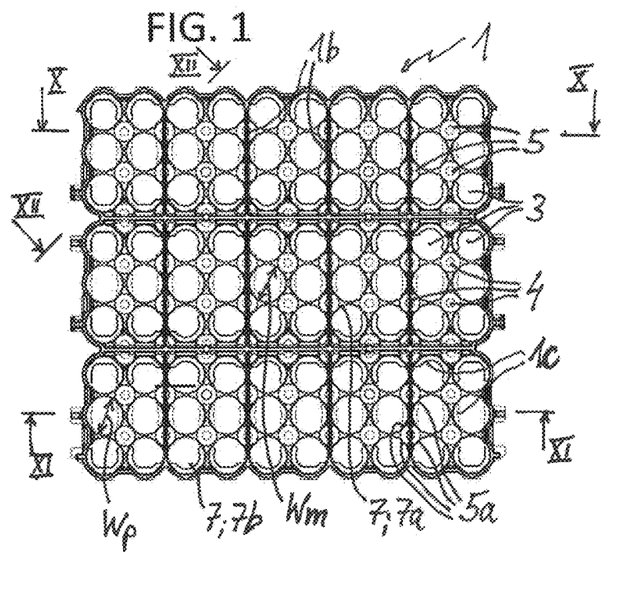
FIG. 1 shows a top view of a holder base part of a cell holder structure for holding rechargeable battery cells.
Figure 2:
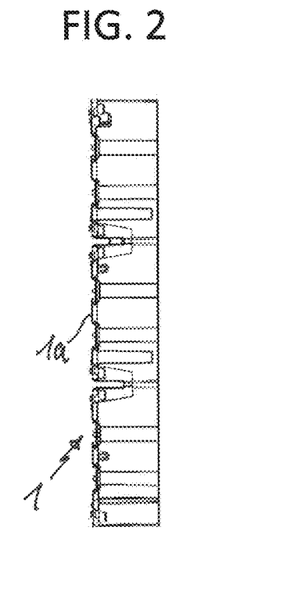
FIG. 2 shows a side view of the holder base part from FIG. 1.
Figure 3:
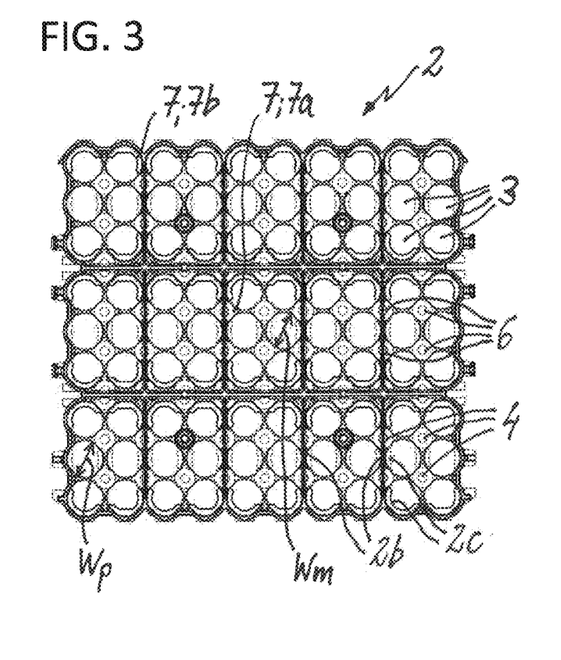
FIG. 3 shows a top view of a holder cover part of the cell holder structure.
Figure 4:
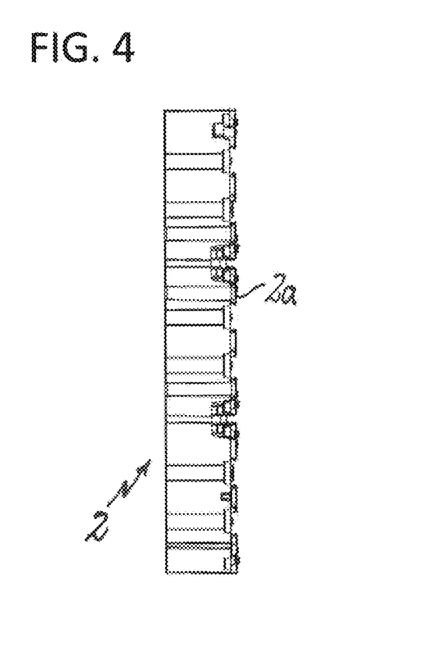
FIG. 4 shows a side view of the holder cover part from FIG. 3.
Figure 5:
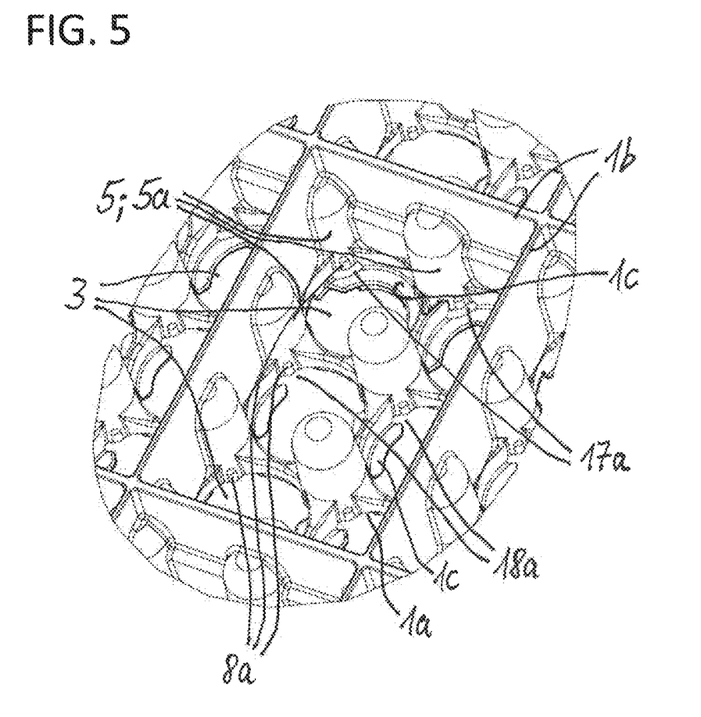
FIG. 5 shows a perspective top view, in partial section, of the holder base part.
Figure 6:
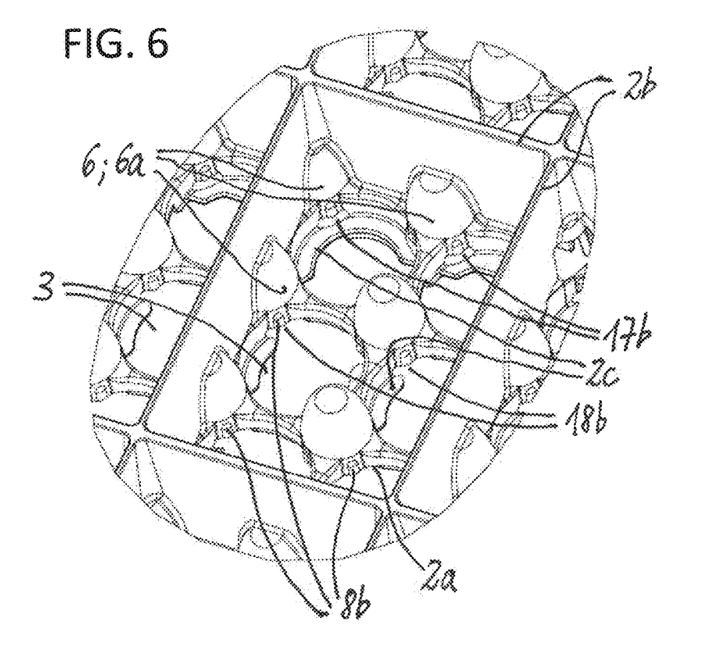
FIG. 6 shows a perspective top view, in partial section, of the holder cover part.
Figure 7:
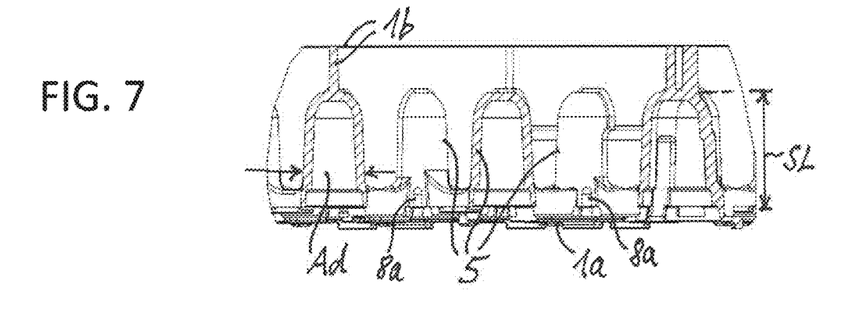
FIG. 7 shows a longitudinal sectional view, in partial section, of the holder base part.
Figure 8:
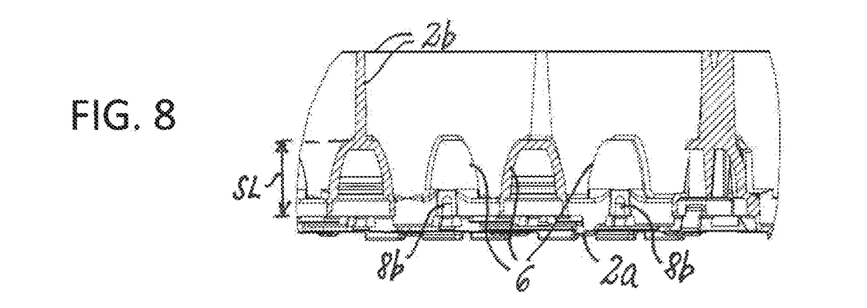
FIG. 8 shows a longitudinal sectional view, in partial section, of the holder cover part.
Figure 9:
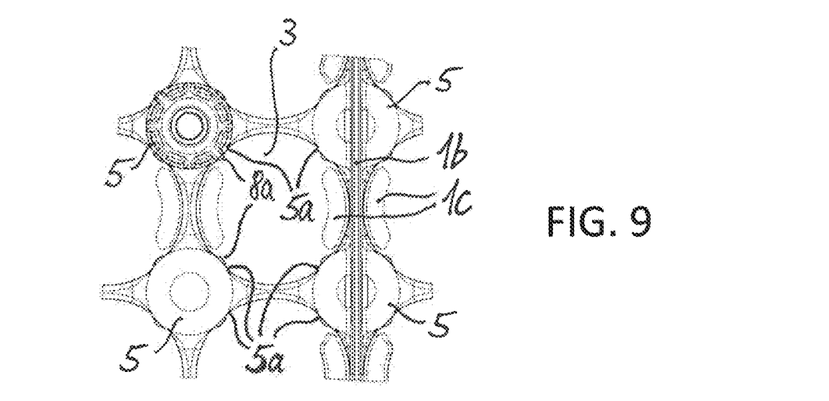
FIG. 9 shows a top view, in partial section, of the holder base part in the region of a cell-receiving space.
Figure 10:
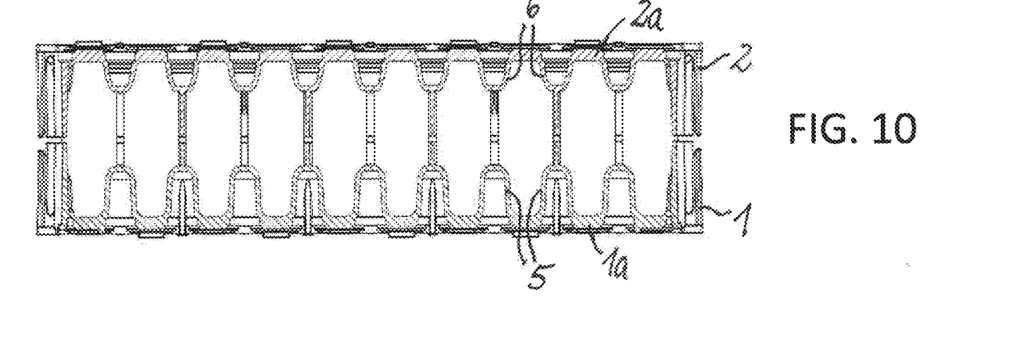
FIG. 10 shows a sectional view along a line X-X from FIG. 1 in a state of the cell holder structure completely fitted with rechargeable battery cells.
Figure 11:
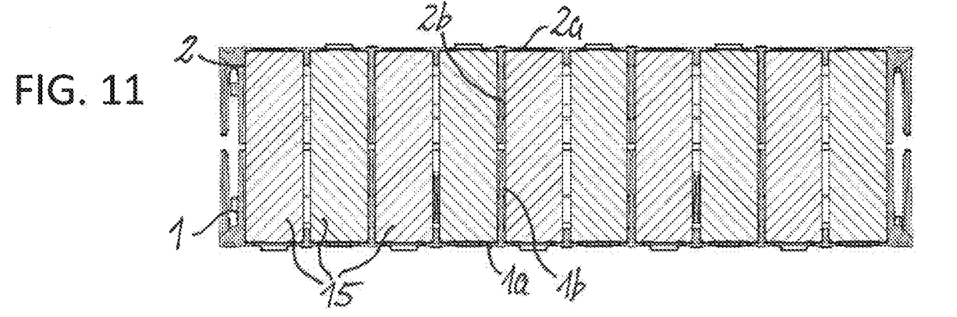
FIG. 11 shows a sectional view along a line XI-XI from FIG. 1 in the state of the cell holder structure completely fitted with rechargeable battery cells.
Figure 12:
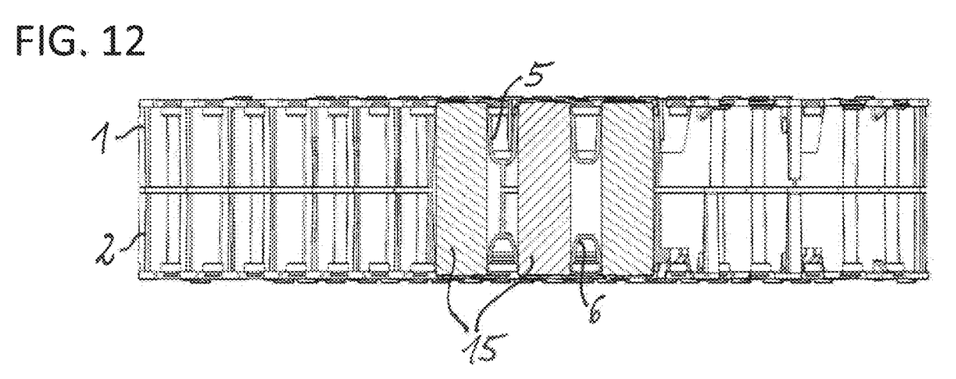
FIG. 12 shows a sectional view along a line XII-XII from FIG. 1 in the state of the cell holder structure completely fitted with rechargeable battery cells.
Figure 13:
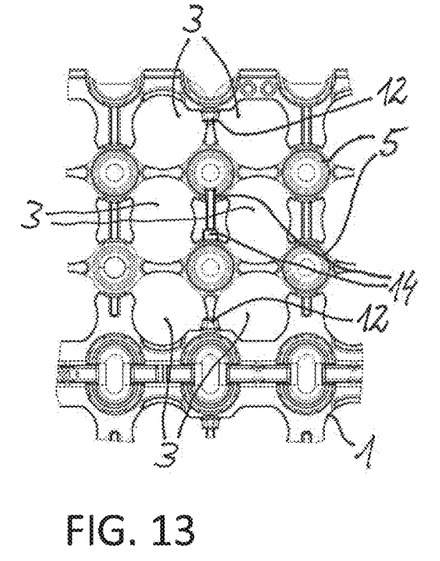
FIG. 13 shows a top view, in partial section, of the holder base part in a region with six cell-receiving spaces.
Figure 14:
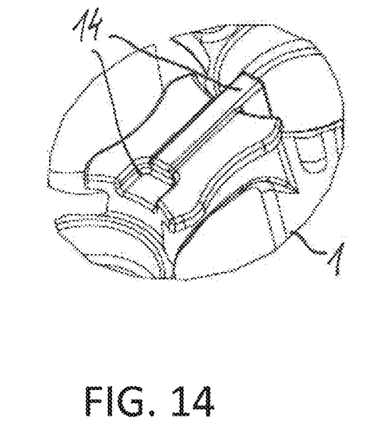
FIG. 14 shows a perspective view, in partial section, of the holder base part in the region of a position mark.
Figures 19, 20, 21:
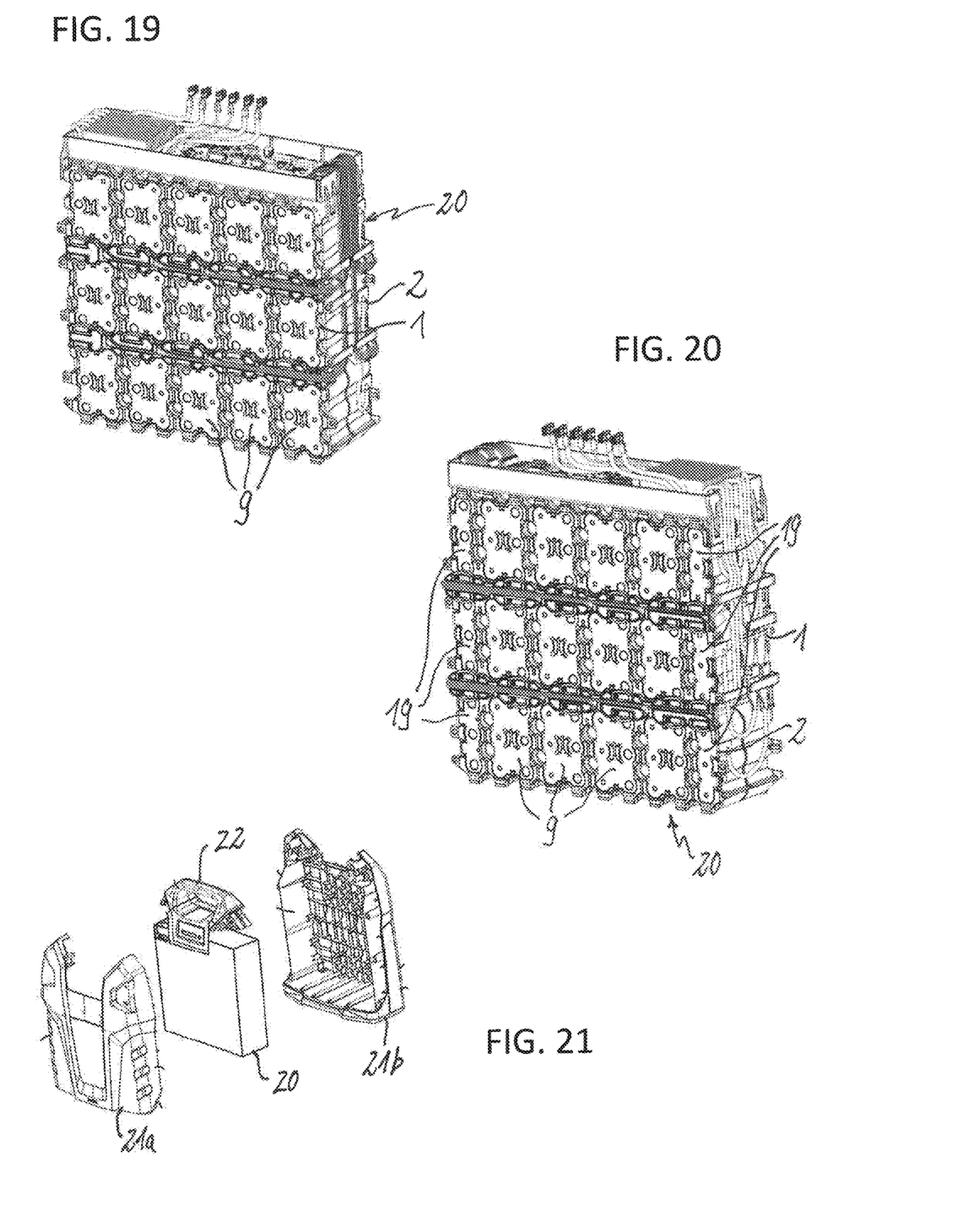
FIG. 19 shows a perspective front view of a rechargeable battery cell block with a cell holder structure mounted and having inserted rechargeable battery cells.
FIG. 20 shows a perspective rear view of the rechargeable battery cell block.
FIG. 21 shows a schematic perspective exploded view of a rechargeable battery pack with a housing and rechargeable battery cell block accommodated therein.

FIGS. 19 and 20 illustrate a rechargeable battery cell block 20 as can be used in a rechargeable battery pack and arises from the assembly of the cell holder structure shown in FIGS. 1 to 18 together with inserted rechargeable battery cells. For the assembly, first of all rechargeable battery cells 15 are fitted, for example, into the holder base part 1, i.e. into its portion of the cell-receiving spaces 3, wherein said rechargeable battery cells are held centred by their cell-supporting pillars 5 and in an axially and radially positionally secured manner. The holder cover part 2 is then placed thereon and pressed together with the holder base part 1, as a result of which the rechargeable battery cells 15 are held supported and pressed in axially on the holder base part 1 and on the holder cover part 2, wherein said rechargeable battery cells are additionally in particular also secured in position radially by the cell-supporting pillars 6 of the holder cover part 2. FIGS. 10 to 12 illustrate the assembled state in three different sectional views. The cell connectors 9, 19 are subsequently mounted. For the axial supporting of the rechargeable battery cells 15, the holder base part 1 and the holder cover part 2 have respective supporting surfaces in the region of the holder base plane 1a or the holder cover plane 2a, said supporting surfaces being formed in the example shown by partially annular supporting ring surfaces 1c, 2c. In alternative embodiments, the supporting surfaces have a different shape; for example, they can be formed as a closed circular disc surface or by supporting webs which extend level with the holder base plane 1a or the holder cover plane 2a radially from the region of the cell intermediate spaces 4 into the region of the cell-receiving spaces 3.

FIG. 21 schematically illustrates a rechargeable battery pack which is equipped with a cell holder structure according to the invention and with a plurality of rechargeable battery cells held by the cell holder structure, here especially in the form of the rechargeable battery cell block 20 (only shown schematically) according to the type of FIGS. 19 and 20, wherein the rechargeable battery cell block 20 is accommodated in a rechargeable battery pack housing consisting of two housing halves 21a, 21b. A handle part 22 having a device-dependent electronic part completes the rechargeable battery pack. The rechargeable battery pack can be used in particular for the electrical energy supply of a hand-held electrical device, such as an electrically driven garden or forest processing device which is portable or is carried on the back or is guided on the ground.

As the above exemplary embodiments make clear, the invention provides an advantageous cell holder structure for holding a plurality of rechargeable battery cells for a rechargeable battery pack, and a corresponding rechargeable battery pack, wherein the cell holder structure is distinguished by a low outlay on manufacturing, simple mounting and secure holding of the rechargeable battery cells.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A cell holder structure for holding a plurality of rechargeable battery cells for a rechargeable battery pack, comprising
   a holder base part and a holder cover part which is connectable to the holder base part, said holder base part and holder cover part together forming an array of cell-receiving spaces and cell intermediate spaces lying inbetween,
   a) wherein at least one of the holder base part and the holder cover part has one or more cell-supporting pillars, where
   in case the holder base part has such pillars, the holder base part has one or more base-side cell-supporting pillars which each extend axially from a base plane of the holder base part into one of the cell intermediate spaces and have a circumferential-side securing wall region which is configured for abutting in an axially and radially position-securing manner against a circumferential surface of rechargeable battery cells to be accommodated in the cell-receiving spaces, and
   in case the holder cover part has such pillars, the holder cover part has one or more cover-side cell-supporting pillars which each extend axially from a cover plane of the holder cover part into one of the cell intermediate spaces and have a circumferential-side securing wall region which is configured for abutting in an axially and radially position-securing manner against a circumferential surface of rechargeable battery cells to be accommodated in the cell-receiving spaces; or
   b) wherein the cell-receiving spaces have a larger, central, clear receiving width in a central region of the array and a smaller, peripheral, clear receiving width in a peripheral region of the array.

2. The cell holder structure according to claim 1, wherein
   at least one of the base-side cell-supporting pillars is of dome-shaped or frustoconical design at least in an axial partial region containing its securing wall region and is widened conically in the direction of the base plane of the holder base part, or
   at least one of the cover-side cell-supporting pillars is of dome-shaped or frustoconical design at least in an axial partial region containing its securing wall region or is widened conically in the direction of the cover plane of the holder cover part.

3. The cell holder structure according to claim 1, wherein
at least one of the base-side cell-supporting pillars has a hollow pillar structure and its securing wall region is exposed towards the base plane of the holder base part, or
at least one of the cover-side cell-supporting pillars has a hollow pillar structure and its securing wall region is exposed towards the cover plane of the holder cover part.

4. The cell holder structure according to claim 1, wherein
at least one of the base-side cell-supporting pillars has, in its securing wall region, a bearing projection protruding radially towards one of the cell-receiving spaces, or
at least one of the cover-side cell-supporting pillars has, in its securing wall region, a bearing projection protruding radially towards one of the cell-receiving spaces.

5. The cell holder structure according to claim 1, wherein
at least one of the base-side cell-supporting pillars or of the cover-side cell-supporting pillars has a greater radial dimension in the peripheral region of the array than at least one of the base-side cell-supporting pillars or of the cover-side cell-supporting pillars in the central region of the array.

6. The cell holder structure according to claim 5, wherein
at least one of the base-side cell-supporting pillars has, in its securing wall region, a bearing projection protruding radially towards one of the cell-receiving spaces, or at least one of the cover-side cell-supporting pillars has, in its securing wall region, a bearing projection protruding radially towards one of the cell-receiving spaces, and
the bearing projection of at least one of the base-side cell-supporting pillars or of the cover-side cell-supporting pillars has a greater radial dimension in the peripheral region of the array than the bearing projection of at least one of the base-side cell-supporting pillars and/or of the cover-side cell-supporting pillars in the central region of the array.

7. The cell holder structure according to claim 1, wherein
at least one of the base-side cell-supporting pillars has a greater pillar length than the cover-side cell-supporting pillars.

8. The cell holder structure according to claim 1, wherein
the cell-receiving spaces are configured for receiving the rechargeable battery cells in an identical position axially irrespective of the pole direction, and
at least one plate-shaped cell connector is provided which can be mounted on the holder base part or on the holder cover part and in each case has at least one positive pole contact zone and at least one negative pole contact zone, said pole contact zones protruding at a differing contact zone height from a plate plane of the cell connector.

9. The cell holder structure according to claim 8, wherein
a plurality of structurally identical cell connectors is provided, said cell connectors being able to be mounted either on the holder base part or on the holder cover part.

10. The cell holder structure according to claim 8, wherein
the at least one plate-shaped cell connector is mountable on the holder base part or on the holder cover part by a clamping or snap connection.

11. The cell holder structure according to claim 8, wherein
corresponding positioning marks are provided on the at least one plate-shaped cell connector, on the one hand, and on the holder base part or on the holder cover part, on the other hand, for positionally correctly mounting the at least one plate-shaped cell connector on the holder base part or on the holder cover part.

12. A cell holder structure for holding a plurality of rechargeable battery cells for a rechargeable battery pack, comprising:
a holder base part and a holder cover part which is connectable to the holder base part, said holder base part and holder cover part together forming an array of cell-receiving spaces and cell intermediate spaces lying inbetween,
wherein
the cell-receiving spaces are configured for receiving the rechargeable battery cells in an identical position axially irrespective of the pole direction, and
at least one plate-shaped cell connector is provided which can be mounted on the holder base part or on the holder cover part and in each case has at least one positive pole contact zone and at least one negative pole contact zone, said pole contact zones protruding at a differing contact zone height from a plate plane of the cell connector.

13. The cell holder structure according to claim 12, wherein
a plurality of structurally identical cell connectors is provided, said cell connectors being able to be mounted either on the holder base part or on the holder cover part.

14. The cell holder structure according to claim 12, wherein
the at least one plate-shaped cell connector is mountable on the holder base part or on the holder cover part by a clamping or snap connection.

15. The cell holder structure according to claim 12, wherein
corresponding positioning marks are provided on the at least one plate-shaped cell connector, on the one hand, and on the holder base part or on the holder cover part, on the other hand, for positionally correctly mounting the cell connector on the holder base part or on the holder cover part.

16. A rechargeable battery pack, comprising:
a cell holder structure; and
a plurality of rechargeable battery cells held by the cell holder structure,
wherein
a) the cell holder structure comprises a holder base part and a holder cover part which is connectable to the holder base part, said holder base part and holder cover part together forming an array of cell-receiving spaces and cell intermediate spaces lying inbetween,
1) at least one of the holder base part and the holder cover part has one or more cell-supporting pillars, where in case the holder base part has such pillars, the holder base part has one or more base-side cell-supporting pillars which each extend axially from a base plane of the holder base part into one of the cell intermediate spaces and have a circumferential-side securing wall region which is configured for abutting in an axially and radially position-securing manner against a circumferential surface of rechargeable battery cells to be accommodated in the cell-receiving spaces, and where in case the holder cover part has such pillars, the holder cover part has one or more cover-side cell-supporting pillars which each extend axially from a cover plane of the holder cover part into one of the cell intermediate spaces and have a circumferential-side securing wall region which is configured for abutting in an axially and radially position-securing manner against a circumferential surface of rechargeable battery cells to be accommodated in the cell-receiving spaces, or 2) the cell-receiving spaces have a larger, central, clear receiving width in a central region of the array and a smaller, peripheral, clear receiving width in a peripheral region of the array, or b) the cell holder structure comprises a holder base part and a holder cover part which is connectable to the holder base part, said holder base part and holder cover part together forming an array of cell-receiving spaces and cell intermediate spaces lying inbetween, wherein the cell-receiving spaces are configured for receiving the rechargeable battery cells in an identical position axially irrespective of the pole direction, and at least one plate-shaped cell connector is provided which is mountable on the holder base part or on the holder cover part and in each case has at least one positive pole contact zone and at least one negative pole contact zone, said pole contact zones protruding at a differing contact zone height from a plate plane of the cell connector.

\* \* \* \* \*